April 17, 1934.  E. H. SMYTHE  1,954,958

ELECTRIC GLOW DISCHARGE LAMP

Filed June 26, 1930

INVENTOR
E. H. SMYTHE
BY G. H. Heydt.
ATTORNEY

Patented Apr. 17, 1934

1,954,958

UNITED STATES PATENT OFFICE 1,954,958

ELECTRIC GLOW DISCHARGE LAMP

Edwin H. Smythe, Evanston, Ill., assignor to Bell Telephone Laboratories, Incorporated, New York, N. Y., a corporation of New York Application June 26, 1930, Serial No. 463,868

16 Claims. (Cl. 176—122)

This invention relates to electric glow discharge lamps, and more particularly to lamps suitable for use in photographic sound recording systems.

Various types of lamps are used in sound recording systems for providing light for the actinism of the film. Regardless of the light source the light projected to the film is invariably in the form of a thin line. In some systems a so-called physical slit is used which is usually brought about by the careful and costly construction of laminated materials of which quartz is the base. In order that the thin line of light be maintained the film is carried adjacent to the physical slit which procedure at times mars the surface of the film. An objection to this type of slit is the rapid destruction of the quartz which is roughened and chipped by the film.

An optical slit is used in a number of sound recording systems for projecting light to the film in a thin line. This optical slit ordinarily comprises a series of lenses for bringing the light to the proper intensity, an intermediate physical slit and a second series of lenses for projecting light to the film. This arrangement is not subject to deterioration. Difficulty is, however, experienced in obtaining light of the proper intrinsic brilliance for photographic exposure on account of the loss in the lenses, particularly when the original brilliance of the light source is low.

The object of this invention is, therefore, to create a light source of variable intensity, capable of modulation by sound currents, of such dimensions that it may be directly projected onto a film, and of sufficient intrinsic brilliance to provide proper photographic exposure.

A further object is in the provision of an electric discharge lamp having one of its electrodes so shaped and disposed as to form a part of the gas envelope and having a window in one of said electrodes to permit the utilization of the light produced by the luminous discharge.

A further object of this invention is to create a light source in an electric discharge lamp in which the light is so shaped that substantially all of said light is useful and may be projected as originated, this light being of small glow area which is more sensitive to modulation and therefore requires less amplification of the modulating currents for a given result.

One embodiment of the invention comprises an electric discharge lamp so constructed that the cathode forms a part of the gas envelope. The remaining portion of the envelope containing the anode is of sufficient size to include a plentiful supply of gas for replenishing gas deterioration which may take place during excitation. Forward of the anode is a flat and comparatively wide cathode arranged to produce a thin line of light of the proper width for sound recording. It is inherent in discharge lamps of this type that a space exists between the surface of the cathode and the negative glow known as Crookes dark space. The thickness of this dark space varies according to gas pressure and applied voltage particularly when the cathode consists of two plain parallel surfaces placed close together. A substantially normal dark space is obtained, under the proper gas pressure, between each cathode wall and a central negative glow. Under low gas pressures undesirable results are often obtained in a lamp having a cathode of this character since the dark space is of small dimension and objectionable heating is sometimes developed. Accordingly a comparatively high gas pressure is ordinarily maintained to obtain satisfactory results. The dark space hereinafter referred to is of adequate dimension for obtaining the results described. The dimensions between the upper and lower walls of the cathode in the discharge lamp of the present invention is slightly greater than two dark spaces, only sufficient room being allowed for a thin line of negative glow which is pinched between the upper and lower dark spaces. A window made of quartz or other suitable material is set in the end of the cathode furthest from the anode in order to permit the light from the negative glow to be projected on to an adjacent object.

The thickness of the cathode at the window end is diminished to less than two minimum dark spaces and may be diminished to approximately the thickness of the negative glow. This is done for the purpose of establishing a dark space at this end of the cathode for keeping the negative glow a given distance away from the window to minimize the gathering of cathode discharge material on the inner surface of the window. Such deposit is substantially eliminated by slanting the cathode surfaces toward the window. It is well-known that the cathode discharge drives in a straight line toward the negative glow. Thus, with the cathode walls slanted toward the window, the cathode discharge is driven through the end space toward the glow and away from the window. While the space adjacent to the cathode walls is known as a dark space, it is transparent and light from the negative glow may be reflected from the walls. Therefore, the narrowing of the width of the cathode at the end has the added advantage of minimizing slant light reflections from the side walls of the cathode which, if permitted, would cause the projection of a light greater in width than the width of the negative glow.

Electric discharge lamps of this character are used for sound film recording systems which require the actinism of only a certain portion of the film upon each exposure as controlled by a particular sound volume and frequency. Ordinarily the thickness of the light beam for the actinism of a film is controlled by devices which are attached to the camera or recording machine. Since the construction of this electric discharge lamp is such that the thickness of light beam is of the desired dimensions for sound track recording, and since the intensity of light may be varied by sounds of different volume and frequency, the foregoing devices of the camera or recording machine are unnecessary and may therefore be eliminated. The camera or recording machine may be equipped with a heat dissipating receptacle in the form of a socket or jack for holding the present discharge tube in place with the window adjacent to the film. If desired, the socket or jack may be used as one of the terminals of the exciting circuit of the lamp.

The features of the invention will be better understood from the illustrated embodiment in which:—

Figure 4:
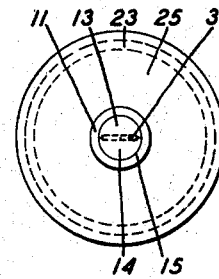

Fig. 4 an end view of the lamp at the cathode end; and

Figure 5:
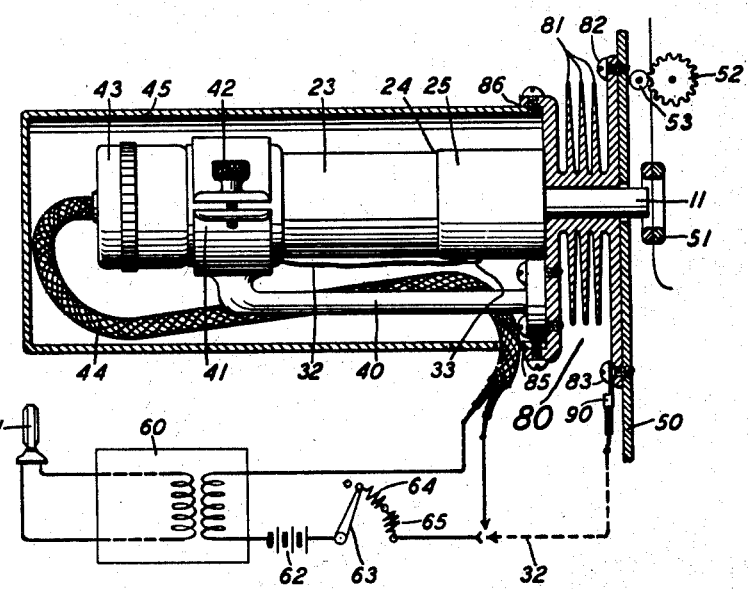

Fig. 5 is a view of the electric discharge lamp associated with a recording camera.

Figure 1:
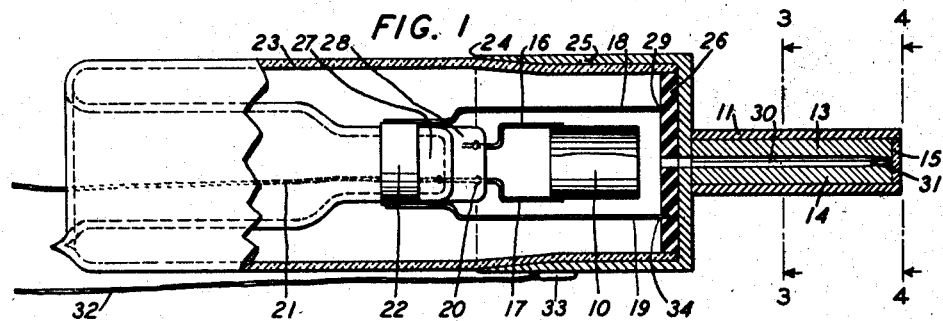
Fig. 1 is a sectional view of the electric discharge lamp showing the related position of the electrodes and the long, narrow inner portion of the cathode.

The invention is disclosed particularly for use in sound picture recording systems. Referring to the drawing, the electrode discharge device in one embodiment as shown in Fig. 1 comprises an enclosing vessel made partly of glass and partly of metal. The main body 23 of the enclosing vessel or envelope is made of glass with a reentrant tube as shown at 27 through which the leading-in wire 21 for the anode is carried and sealed therein. The metal portion of the enclosing vessel comprises a metal cap 25 fitted over the forward part of the glass portion of the enclosing vessel and sealed thereto at 24 by a process such as disclosed in Patent 1,294,466, issued to W. G. Houskeeper, February 18, 1919. The metal portion of the enclosing vessel further comprises an active cathode portion which extends forward from the metal cap 25 and is fastened thereto or made a part thereof. A window 15 is sealed into the forward end of the cathode which completes the enclosing vessel.

Figure 2:
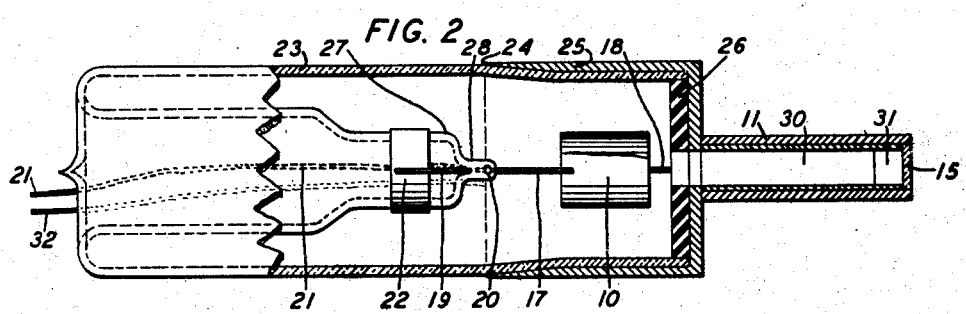
Fig. 2 is a sectional plan view of the electric discharge lamp shown in Fig. 1.

The related position of the electrodes is as shown in Figs. 1 and 2. The anode 10 is formed in a cylinder preferably of nickel. The anode is made annular in order to be out of the light line of the cathode opening. As previously stated the cathode extends forward from the metal cap in the form of a plug and is disclosed as being composed of a metal cylinder or tube 11, two semi-circular elongated metal parts 13 and 14 and the quartz window 15. Between the forward ends of the glass envelope is a lavite disc 26 which covers the inner surface of the metal cap 25 to make this surface non-active and restrict the cathode glow to the slot formed by semi-circular elongated parts 13 and 14. The lavite disc 26 is slotted at 29 and 34 for supports 18 and 19 which are sweated to the nickel collar 22. The disc is thus firmly held in place and prevented from turning. A portion of the reentrant stem 27 is flattened at 28 for receiving and sealing the leading-in wire and anode supports 21, 16 and 17. The flattened portion 28 of the reentrant stem is best shown in Fig. 2. The anode supports 16 and 17 are preferably made of nickel and welded with platinum. Support 17 is connected to the copper leading-in wire 21. The electrical connection for the cathode may be made external at any point on the cathode wall or to a jack such as 80 into which the cathode may be plugged. A soldered connection is shown at 33 to a copper wire 32, which is extended to the base of the lamp. The alternate methods of electrical connection to the cathode direct or to the jack 80 are shown in Fig. 5.

The enclosing vessel or envelope of which the cathode is a part, contains a filling of inert monatomic gas, such as helium, argon or neon, or a mixture of monatomic gas and a small quantity of an easily ionized diatomic gas such as nitrogen, hydrogen or oxygen combined in a manner to give the desired actinic qualities.

The sectional view of the cathode illustrated in Fig. 1 discloses a long and narrow space 30 for the cathode glow. When the proper voltage is applied to the terminals connected to leading-in wires 21 and 32, a line or sheet of glow extends nearly the entire length of the space 30 which provides a light of great depth, which contributes greatly to the brilliance of the light projected through window 15. The inner walls of the cathode, parts 13 and 14, are brought together at the forward end as shown at 31, in order to prevent the glow from reaching the quartz window 15. As previously brought out the distance between the inner walls of the cathode is only great enough to accommodate a thin line of glow which exists between two dark spaces in alignment with the inner walls of the active cathode. At the forward end of the cathode a dark space also exists just to the rear of the window, since the distance between the walls is diminished below the minimum dimension for two dark spaces. The cathode discharge from the forward end of the cathode walls is thus directed toward the glow which starts at a point where the distance between the walls is slightly greater than two dark spaces. A further reason for diminishing the size of the cathode at 31 is to eliminate the projection of light rays reflected from the inner walls of the cathode. Thus a thin line or sheet of light without reflections and of considerable depth is projected through window 15.

By referring to Fig. 2 the width of the cathode and therefore the approximate length of the line of glow may be seen. This width may be approximately the length of the sound track.

Figure 3:
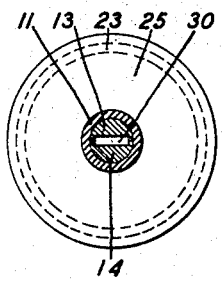
Fig. 3 is a sectional view of the cathode parts.

The construction of the cathode as herein disclosed is best shown in Fig. 3 which is a cross-section of the cathode showing the shape of the opening 30, the cylindrical portion 11 and the semi-circular parts 13 and 14. These semi-circular parts are sweated to the inner wall of the metal cylinder 11. The slot 30 is shaped in the semi-circular parts 13 and 14 before said parts are sweated to cylinder 11. While a specific method of constructing the cathode has been shown, it should be borne in mind that this cathode can be constructed by shaping a tube to proper dimensions and in many different ways for commercial use without departing from the spirit of the invention.

Referring now to Fig. 4, the opening 35 in the end of the cathode directly behind the window 15 is shown. The window 15 may be a fused quartz window soft-soldered or otherwise sealed to the cathode parts 13 and 14 and the inner wall of the cylindrical tube 11.

Referring now to Fig. 5, the electric discharge lamp may be seen associated with a recording camera of conventional design in which a film is carried before a picture lens and thence past a point at which sound recording takes place by a toothed sound sprocket such as shown at 52, with a guide roller 53 for maintaining the film in position on the sprocket. A device of conventional design is shown at 51 for maintaining the film in position at the point at which sound recording takes place. The camera wall is shown at 50. The cathode window of the electric discharge lamp may be positioned as close to the film as required for sound recording. A preferable arrangement, however, is to provide a fixed position for the lamp with the cathode plug inserted in the receptacle or jack 80 and with cap 25 abutting the surface of jack 80 as shown in Fig. 5. The cathode window is thus held in proper relation to the film.

Jack 80 is fastened to the camera wall 50 by screws 82 and 83. This jack is provided with fins preferably of thin copper for radiating and dissipating the heat developed in the cathode. These fins may be circular in form or merely extended from a flat surface at the top and bottom of the jack. The inner surfaces of the jack are fitted closely to the outer surfaces of the cathode for heat dissipating purposes and for electrical connection when conductor 32 is externally connected as shown at 90.

A bracket for maintaining the lamp in position is shown at 40 attached to jack 80 at one end and arranged with clamp 41 at the alternate end for holding the body of the lamp. Thumb screw 42 is used for adjusting the clamp which also accommodates the adjustment of the lamp with relation to the film if required. A protective encasement for the lamp is shown at 45 fastened to the jack by machine screws at 85 and 86. This encasement is merely to prevent damage to the lamp or to prevent an accidental change in position of the lamp through carelessness. The encasement 45 may be constructed in the manner of a cage with holes therein in order that the slight heat developed by the lamp may be properly dissipated.

The anode lead-in wire 21 and the cathode lead-in wire 32 are connected through cord 44 to the output coil of amplifier 60 and thence to the microphone 61. The amplifier 60 and the associated circuit are of conventional design for controlling the intensity of light projected by the electric discharge lamp in accordance with the volume and frequency of the sounds brought to microphone 61. A constant potential is impressed upon the electrodes of the discharge lamp by battery 62 under the control of switch 63 which may be regulated to include or exclude series resistances 64 and 65.

While this lamp gives a sufficiently intrinsic illumination for recording sound on film it should be understood that in specific cases an optical system may be warranted between the cathode window and the film. Such an arrangement may be used without departing from the spirit of the invention.

While only one method of construction has been disclosed for the electric discharge lamp, it is of course understood that various other structural modifications may be made without departing from the scope of the invention.

The dimensions of the glow discharge space in the cathode will be proportioned in accordance with the dimensions and intensity of the light desired to be developed. In the drawing these dimensions, for clearness of illustration, are shown exaggerated.

What is claimed is:

1. An electric discharge lamp having an electrode so shaped and disposed as to form a part of the gas envelope, and a transparent window in said electrode to permit utilization of the light produced by the luminous discharge of said electrode.

2. An electric discharge lamp having an electrode constructed to form a part of the gas envelope and comprising two elongated opposed surfaces close together to confine a glow light produced by discharge from said electrode to a single thin sheet.

3. An electric discharge lamp having an electrode constructed to form a part of the gas envelope and comprising two elongated opposed surfaces close together to confine a glow light produced by discharge from said electrode to a thin sheet, and a window in said electrode through which said sheet of light is projected.

4. An electric discharge lamp having one electrode constructed to form a part of the gas envelope and a second electrode within said envelope, said first electrode comprising two elongated and comparatively wide opposed surfaces close together to confine a glow light produced by discharge from said first electrode to a thin and comparatively wide sheet, and a window conforming to the shape of the electrode producing said glow for confining the projection of said light to a thin and comparatively long line.

5. An electric discharge lamp having an anode and cathode, said cathode being constructed to form a part of the gas envelope, said cathode comprising two elongated and comparatively wide surfaces close together to confine the negative glow to a thin line or sheet.

6. An electric discharge lamp having an anode and cathode, said cathode being constructed to form a part of the gas envelope, said cathode comprising elongated and comparatively wide inner walls close together to pinch the negative glow to a thin line or sheet between Crookes dark spaces in alignment with said inner walls.

7. An electric discharge lamp having an anode and cathode, said cathode being constructed to form a part of the gas envelope, said cathode comprising two elongated and comparatively wide opposed walls close together extending forward from the anode to confine the negative glow light to a line or sheet and project said light from the forward end of said cathode.

8. An electric discharge lamp having an anode and cathode, said cathode being constructed to form a part of the gas envelope, a window in one end of said cathode, said cathode being forward of the anode and having two elongated opposed walls close together to confine the negative glow to a line or sheet, and so project a line of light through said window.

9. An electric discharge lamp having an anode and cathode, said cathode being constructed to form a part of the gas envelope, a window in the end of said cathode, the major portion of said cathode comprising closely aligned walls to pinch the negative glow to a thin line or sheet between the Crookes dark spaces in alignment with its walls, said walls being slanted at the window end to decrease the distance between wall surfaces such as to prevent glow and thus provide a Crookes dark space at the window end to prevent discoloration of the inner side of said window.

10. An electric discharge lamp having a metal anode, a metal cathode, said cathode being constructed to form a part of the gas envelope, a window in the end of said cathode furthest from the anode, said cathode being in the form of an elongated rectangular tube of such dimension that the negative glow is pinched between Crookes dark spaces aligning the inner walls of said tube, said walls being slanted at the window end to decrease the distance between wall surfaces such as to prevent glow and thus provide a Crookes dark space adjacent to the window.

11. An electric discharge lamp having an anode and a cathode, said cathode being of flat tubular construction, positioned forward of the anode, to pinch the negative glow produced within said cathode tube to a thin line or sheet and project the light rays in the form produced by said glow from the end of the cathode furthest from the anode.

12. An electric discharge lamp comprising an anode and a flat hollow cathode of an approximate thickness between its inner walls of two Crookes dark spaces and minimum negative glow for pinching out the negative glow to a thin line or sheet, and a window at the end of said cathode furthest from the anode.

13. An electric discharge lamp having an anode and a flattened hollow cathode with its upper and lower inner walls separated approximately the thickness of two Crookes dark spaces and minimum negative glow for pinching out the negative glow to a thin sheet and having its outer walls shaped in the form of a plug for insertion into a receptacle and a window at the end of said plug cathode arranged for the projection of a thin line of negative glow light rays from the end of the cathode furthest from the anode.

14. An electric discharge lamp having an anode and a cathode, said cathode being of flat tubular construction forming a part of the gas envelope with a window in the end of said cathode farthest from the anode so that the negative glow light rays are projected through said window.

15. An electric discharge lamp having one electrode constructed to form a part of the gas envelope, a second electrode, said first electrode comprising two elongated surfaces close together to limit the propulsion of the glow discharge from said surfaces to a short distance towards said second electrode and consequently to confine the glow light between said surfaces to a single thin sheet.

16. An electric discharge lamp having an anode and a cathode, said cathode being constructed to form a part of the gas envelope, which envelope comprises a large body portion and an elongated narrow slot in the cathode extending forward of the large body portion, the narrow dimensions of the slot being between two walls of the cathode to pinch the negative glow light to a single thin sheet and a window at the forward end of said slot.

EDWIN H. SMYTHE.